United States Patent Office 3,557,173
Patented Jan. 19, 1971

3,557,173
PROCESS FOR RECOVERING COBALT ACETATE
Alvin E. Trevillyan, Glenwood, Ill., assignor to
Sinclair Research Incorporated
No Drawing. Filed May 9, 1968, Ser. No. 728,054
Int. Cl. C07f 15/06; C07c 51/42
U.S. Cl. 260—439                          10 Claims

ABSTRACT OF THE DISCLOSURE

The cobalt recovery process of the present invention can provide substantially complete recovery of cobalt acetate catalyst from the oxidation of meta- or para-xylene to phthalic acids, the cobalt acetate being in catalytically-active form and relatively free from side reaction and metal corrosion products. The reaction medium which contains acetic acid solvent, after treatment to recover the isophthalic or terephthalic acid product, is then dehydrated, by physical or chemical means, cooled if desired, and filtered to recover insoluble, anhydrous cobalt acetate, while the by-product acids and metal corrosion products remain in the acetic acid solvent. The catalyst is reformed by dissolving the cobalt acetate in fresh acetic acid containing enough water to form the soluble tetrahydrate from the anhydrous salt.

---

This invention is concerned with a method for the recovery of cobalt acetate oxidation catalyst from reaction mixtures produced by the liquid phase oxidation of meta- or para-xylene to isophthalic or terephthalic acid with an oxygen-containing gas.

It is known that meta- and para-xylene may be converted into their corresponding phthalic acids, i.e., isophthalic and terephthalic acid, respectively, by effecting oxidation in the presence of a suitable solvent medium, preferably a fatty acid of 2 to 6 carbon atoms, such as acetic acid, and an oxidation catalyst which is a soluble carboxylic acid salt of a catalytically-active metal, such as cobalt, at elevated temperatures and at pressures sufficient to maintain a liquid phase reaction medium. In the oxidation of meta- and para-xylenes to the corresponding phthalic acids, it is preferred to conduct the reaction in acetic acid using a cobalt acetate catalyst. The feedstock can be meta-xylene, para-xylene, or their mixtures, and the feed can contain minor amounts of other materials, e.g., hydrocarbons such as ortho-xylene, ethylbenzene, etc.

The reaction mixture withdrawn from the oxidation zone will ordinarily comprise an acetic acid slurry of the isophthalic or terephthalic acid, cobalt acetate, cobalt phthalate, and substantial amounts of extraneous materials, such as, for instance, by-product water, unreacted xylene, if any, and various secondary reaction products, such as mono- and di-carboxylic acids and other oxygenated materials. These by-products will often be principally toluic and benzoic acids, with small amounts of ortho-phthalic acid also being present. When the solid isophthalic or terephthalic acid product is removed from the reaction mixture as by filtration, a mother liquor remains containing the catalyst, acetic acid, and the secondary reaction products from the main feed component or from other materials charged to the reaction zone. The particular amount and type of these by-products depend upon the incidence of their precursors in the xylene feed stock and upon the conditions of the oxidation reaction. In a feed stock of any isomer of xylene, such as meta-xylene, there are often minor but appreciable amounts of other isomers, such as ortho- and para-xylene and ethyl benzene, and smaller amounts of other impurities such as paraffins, naphthenes, and nitrogen- and sulfur-containing compounds. These materials will ordinarily be oxidized under the conditions of the reaction to the corresponding carboxylic acids or intermediate oxidation products, and, particularly in the case of ortho-xylene, which is oxidized to ortho-phthalic acid, can prove detrimental to the catalyst. Further contaminants such as metal corrosion products serve to inhibit, reduce, or destroy entirely the activity of the catalyst solution. The expense of the catalyst requires that it be reused, but the buildup of contaminants in the system renders necessary the elimination of such contaminants for satisfactory operation.

The prior art has suggested separation of the catalyst from the by-products by the differences in their water solubilities. Cobalt acetate is very soluble in water while the by-products have a very limited solubility. U.S. Pat. No. 2,964,559, for instance, discloses treating the solution from the product recovery stage to remove the solvent acetic acid and water as by distillation. The solid residue, containing aromatic acids, catalyst, and some coke or tar-like oxidation by-products, is treated with water to dissolve the catalyst. Filtration then produces a solid filter cake containing the by-products and a filtrate containing the catalyst dissolved in water. Upon evaporation to dryness, the extract from the solids proves to contain more than 90% of the catalyst and a substantial amount of orthophthalic acid. However, when the cobalt acetate is subsequently dissolved in acetic acid to provide catalyst solution for recycle to the oxidation reactor, the orthophthalic acid will react with the cobalt to form cobaltous phthalate, which has little if any catalytic activity. Thus, while the water solubility based separation achieves substantial removal of oxidation by-products from the catalyst, the orthophthalic acid which is the most detrimental component of the system is the component least effectively removed.

It is an object of this invention to provide a method whereby cobalt acetate can be advantageously recovered in reusable form from the reaction mixture resulting from the oxidation of meta- or para-xylene, or mixtures thereof, to corresponding phthalic acids. Other objects will be apparent from the following description of the invention.

In accordance with the present invention, a process is provided whereby cobalt acetate is recovered from a reaction mixture resulting from cobalt acetate catalyzed oxidation of meta- or para-xylene, or mixtures thereof, to form the corresponding phthalic acids. The process of the present invention comprises treating the reaction mixture, depleted of solid phthalic acid product, to remove water. Dehydration serves to render cobalt acetate insoluble, and the anhydrous solid cobalt acetate is separated from the dehydrated reaction mixture by conventional solid-liquid separation techniques.

Although cobaltous phthalate forms readily in aqueous acetic acid solution, dehydration of the system readily converts the salt to anhydrous cobalt acetate and orthophthalic anhydride. The anhydrous cobalt acetate is insoluble and may be recovered as a solid free from the byproducts in the system which remain in solution.

The dehydration proceeds readily and may be conveniently accomplished by either chemical or physical methods. Water from three sources is removed, including free water, water of hydration of the cobalt acetate tetrahydrate, and water produced in the dehydration of orthophthalic anhydride. All water is removed whatever method, or combination of methods, is utilized. Among the more effective are treatment with acetic anhydride, distillation methods, the use of adsorbents, and the like. For instance, heating of the mixture with acetic anhydride effects complete dehydration even before reflux temperature is attained when the water level is within the ordinary operating range for a xylene oxidation system. Dehydration is also complete when about 50% of the solvent is removed by distillation under reflux temperatures, or about 120 to 130° C. in a thirty plate fractional distillation column. A simple one plate laboratory distillation gave only partial dehydration, but addition of a trace amount of sulfuric acid as dehydration catalyst made the one plate distillation equally effective. Distillation can effect complete dehydration by removal of solvent and water. The effectiveness of the distillation determines the amount of solvent which is removed with the water.

When the dehydration is complete, e.g. when the system is freed from free water and water of hydration, and the orthophthalic acid is dehydrated, the cobalt is present as the anhydrous acetate salt which has been found to have a solubility in anhydrous acetic acid of only 0.18 gram per hundred grams of solvent at 25° C., while the phthalic anhydride formed is much more soluble as are the other oxidation by-products. Separation is readily achieved utilizing solubility based liquid-solid separation procedures, such as filtration, decantation, or centrifugation and the like. Since the dehydration operation is ordinarily conducted at elevated temperature, e.g., about 125° C. or reflux temperature, it will often be desirable to cool the anhydrous mixture before separation of the solid cobalt acetate, but there is no narrow requirement for such cooling, however.

The solid cobalt acetate anhydride recovered by the dehydration can be reconstituted into the desired catalytic form by dissolving the salt in acetic acid containing enough water to form the soluble tetrahydrate of cobalt acetate. The acetic acid can be the solvent recovered from the reaction mixture during the dehydration step when distillation is utilized with concurrent recovery of acetic acid, or by distillation of the filtrate from the separation step when other dehydration methods are utilized.

In the xylene oxidation stage, a feed is passed to the reactor comprising the appropriate xylene isomer, i.e., meta- or para-xylene, or mixtures hereof, which will contain minor amounts of the other aforementioned isomers, and other impurities, acetic acid, and the cobalt acetate catalyst. The reactor feed can also contain an oxidation promotor, such as a halide or an aldehyde. There will also be present a minor amount of water, on the order of about 1% by weight, to insure that the catalyst remains in solution and is not dehydrated to an insoluble form. The mixture is then contacted in the reactor with air or other source of oxygen at elevated temperatures often about 250° F. and at elevated pressure sufficient to maintain the mixture in the liquid phase. The oxidation of the side groups occurs readily and the stream removed from the reactor contains the dibasic acid corresponding to the feed, i.e., isophthalic acid for a meta-xylene feed or terephthalic acid for a para-xylene feed, the aforementioned by-product materials, catalyst, acetic acid solvent, and water produced in the oxidation. The mix is cooled to precipitate the product acid, which is recovered by conventional solid-liquid separation procedures, such as filtration and the like, and the mixture depleted in product is treated to recover the catalyst from the by-product materials for recycle to the reactor with fresh feed.

An added advantage in the recovery process involves the limited solubility of iso- or terephthalic product acids, which permits at least a partial recovery of whatever amounts of these materials are not recovered in the product crystallization and filtration. The reaction medium obtained from the product recovery is saturated with the product acid. In all other cobalt recovery processes, this portion of the product is lost with the separated by-products. In the present process, at least a part of this material is returned to the reactor with the catalyst.

EXAMPLE

A simulated catalyst solution was prepared corresponding to the reaction mixture after the recovery of isophthalic acid product from the oxidation of meta-xylene. The solution contained the following components:

Benzoic acid—3.5 g.
m-Toluic acid—5.0 g.
Phthalic acid—18.0 g.
Isophthalic acid—2.5 g.
Cobalt acetate .4H$_2$O—18.3 g.
Acetic acid—500 cc.

This mixture was placed in a 2 liter flask and refluxed several hours. It was then *fractionally distilled* on a 30 plate, glass helices-packed column. Total distillate amounted to 50% of the initial solvent charge. After cooling, the mixture was filtered and the filter cake washed once with glacial acetic acid. The wash liquid was added to the filtrate. The dried solid weighed 13.8 grams and was identified as cobalt acetate by its infrared spectra. Analysis of this salt for aromatic acid content by conventional base-acid extraction techniques found that it contained 1.4 g. isophthalic acid and only traces of benzoic and m-toluic acids, and no orthophthalic acid. The remainder (12.4 g.) was anhydrous cobalt acetate.

The initial acetic acid filtrate was evaporated to dryness on a hotplate, yielding 24.5 g. of a white solid. Analysis of this mixture by vapor phase chromatography showed 19% benzoic acid, 25% m-toluic acid, and 56% phthalic acid. Tabulation of results:

|  | Weight, g. | Theory | Percent recovery |
| --- | --- | --- | --- |
| Cobalt acetate | 12.4 | 13.3 | 93 |
| Total acids | 25.9 | 27.3 | 92 |
| Isophthalic acid | 1.4 | 2.5 | 56 |

Removal of by-product acids, on the basis of those found in the cobalt salt:

|  | Percent |
| --- | --- |
| Phthalic acid | 100 |
| m-Toluic acid | 99 |
| Benzoic acid | 99 |

The anhydrous cobalt acetate is coverted to the catalytically-active acetic acid solution by treating with acetic acid and enough water to form the tetrahydrate of the cobalt acetate. The acetic acid is recoverable from the by-product acids in the separation filtrate by distillation and then recombined with the cobalt acetate as an economy measure.

It is thus seen that the process affords a simple and highly efficient method for the recovery of cobalt from the reaction product obtained in the oxidation of substituted aromatic hydrocarbons.

What is claimed:

1. A method for recovering cobalt acetate from a mixture comprising acetic acid, cobalt acetate, benzoic acid, toluic acid and ortho-phthalic acid, at least part of the cobalt acetate being present as cobalt acetate tetrahydrate, comprising:
   (a) dehydrating the mixture to remove water whereby relatively insoluble anhydrous cobalt acetate is formed; and
   (b) separating the relatively insoluble anhydrous cobalt acetate from the liquid phase of the dehydrated mixture, said liquid phase containing acetic acid, benzoic acid, toluic acid and ortho-phthalic acid.

2. The method of claim 1 wherein the mixture which is dehydrated is the reaction product of an oxygen-containing gas, cobalt acetate catalyzed oxidation of a solution of a feedstock comprising an acetic acid solvent and a member of the group consisting of meta-xylene, para-xylene and mixtures thereof to provide the corresponding phthalic acid, and from which mixture said corresponding phthalic acid has been removed.

3. The process of claim 2 wherein said xylene is meta-xylene.

4. The process of claim 2 wherein said xylene is paraxylene.

5. The process of claim 1 wherein said dehydrating is conducted by distillation of the mixture.

6. The process of claim 1 wherein said dehydrating is conducted by treating the mixture with acetic anhydride.

7. The process of claim 1 wherein the recovered anhydrous cobalt acetate is hydrated to the catalytically active form.

8. The process of claim 7 wherein the anhydrous cobalt acetate is converted to catalytically-active form by treating with acetic acid and sufficient water to convert the anhydride to the tetrahydrate.

9. The process of claim 8 wherein the liquid phase from the cobalt acetate separation step is distilled to recover acetic acid.

10. The process of claim 9 wherein the acetic acid recovered is utilized to convert the separated anhydrous cobalt acetate to the catalytically active cobalt acetate form.

References Cited

UNITED STATES PATENTS

| 2,853,514 | 9/1958 | Brill | 260—524 |
| 2,856,423 | 10/1958 | Grantham et al. | 260—524 |
| 3,459,677 | 8/1969 | Robeson | 252—431 |
| 3,465,013 | 9/1969 | Ichikawa | 260—439 |

OTHER REFERENCES

Pascal: Nouveau Traité de Chimie Minérale Masson et Cie, Paris, 1963, vol. 17, part 2, p. 493.

TOBIAS E. LEVOW, Primary Examiner

A. P. DEMERS, Assistant Examiner

U.S. Cl. X.R.

252—413; 260—524, 525